UNITED STATES PATENT OFFICE.

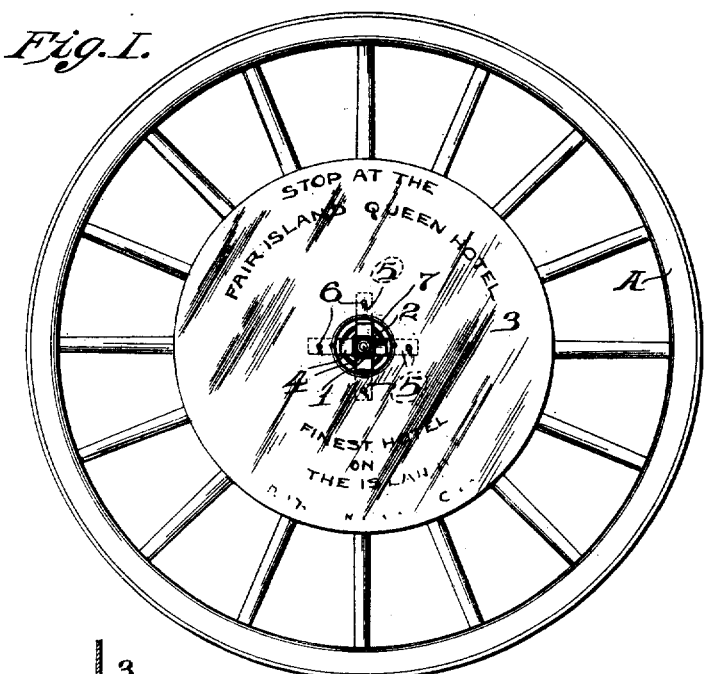
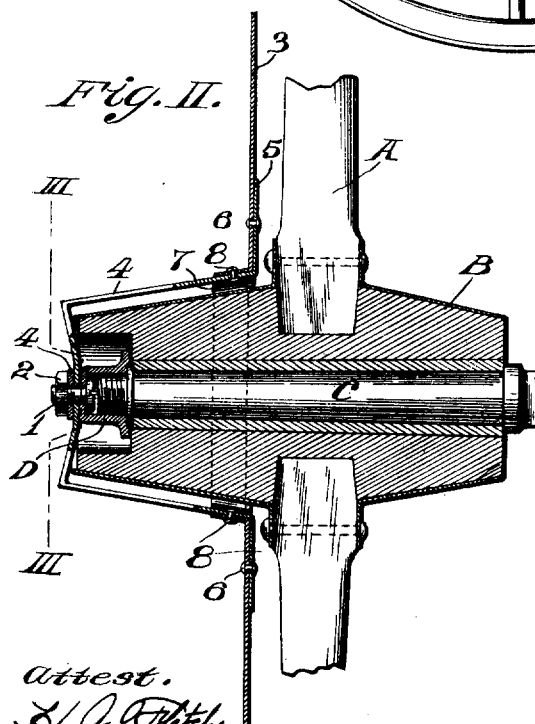
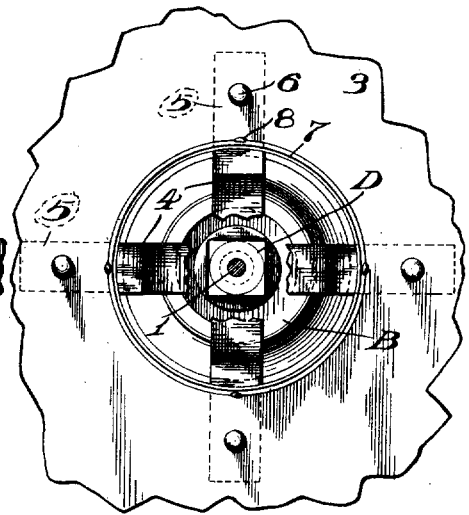

MARTIN F. GESERICH, OF ST. LOUIS, MISSOURI.

ADVERTISING DEVICE FOR VEHICLES.

No. 897,615.   Specification of Letters Patent.   Patented Sept. 1, 1908.

Application filed December 9, 1907. Serial No. 405,722.

*To all whom it may concern:*

Be it known that I, MARTIN F. GESERICH, a citizen of the United States of America, residing in the city of St. Louis and State of Missouri, have invented certain new and useful Improvements in Advertising Devices for Vehicles, of which the following is a full, clear, and exact description, reference being had to the accompanying drawings, forming part of this specification.

My invention relates to an advertising device adapted to be supported at the sides of the wheels of a vehicle, and the invention has for its object the production of a device of this character that may be affixed to the axle nut of a vehicle axle spindle, by which the device is supported at the side of the vehicle wheel journaled to the axle spindle.

Figure I is an elevation of a vehicle wheel and my advertising device. Fig. II is an enlarged section taken through the hub of the vehicle wheel and the central portion of the advertising device. Fig. III is a cross section taken on line III—III, Fig. II.

A designates an ordinary vehicle wheel having a hub B that is journaled to the spindle C of a vehicle axle. D is an axle nut of cap form by which the hub of the vehicle wheel is held to the axle spindle C. No invention *per se* is herein claimed for the parts of the vehicle just mentioned.

To provide for the application of my advertising device to a vehicle, I produce a bolt hole in the outer end of the axle nut D and mount in said bolt hole a bolt 1, that is equipped with a nut 2, as seen in Fig. II. The bolt 1 receives a carrier by which an advertising sheet or plate 3 is supported. The carrier for the advertising sheet or plate comprises a spider frame consisting of two U-shape frame members 4, that cross each other at their bases and are perforated to receive the bolt 1 that passes through the bases of both of the members and upon which bolt the members 4 are securely held under the clamping action of the nut 2 which serves to hold the members confined between it and the outer end of the axle nut. The frame members 4 of the sheet or plate carrier are turned outwardly at their inner ends to provide wings 5 against which the sheet or plate 3 is seated and said sheet or plate is secured to these wings by rivets 6, or other suitable fastening means.

7 is a connecting band that surrounds the carrier members 4, adjacent to their inner ends and which is secured to the members by rivets 8, or other suitable fastening means. This band has the service of stiffening the sheet or plate carrier, in addition to its service as a means for connecting the arms of said carrier.

The herein described advertising device may be readily associated with the wheel of any ordinary vehicle and it will be readily appreciated that inasmuch as the carrier, by which the advertising sheet or plate is supported, is attached to and supported by the axle nut of the axle spindle, the device is always maintained in a fixed position, relative to the vehicle wheel that revolves back of it.

I claim:—

1. In an advertising device of the character described, the combination with an axle nut of a vehicle, of an advertising sheet or plate, a carrier for said sheet or plate comprising frame members to which the sheet or plate is attached, a band connecting said frame members, and means whereby said carrier may be attached to said axle nut, substantially as set forth.

2. In an advertising device of the character described, the combination with an axle nut of a vehicle, of an advertising sheet or plate, a carrier for said sheet or plate comprising a pair of crossed U-shape frame members having wings at their inner ends to which said sheet or plate is attached, a band connecting said frame members, and means whereby said frame members are attached to said axle nut.

In testimony whereof, I have hereunto set my hand this 7th day of December, 1907.

MARTIN F. GESERICH.

In the presence of—
BLANCHE HOGAN,
H. G. COOK.